E. C. SHAW.
VEHICLE WHEEL RIM.
APPLICATION FILED MAY 25, 1907.
1,055,496.
Patented Mar. 11, 1913.
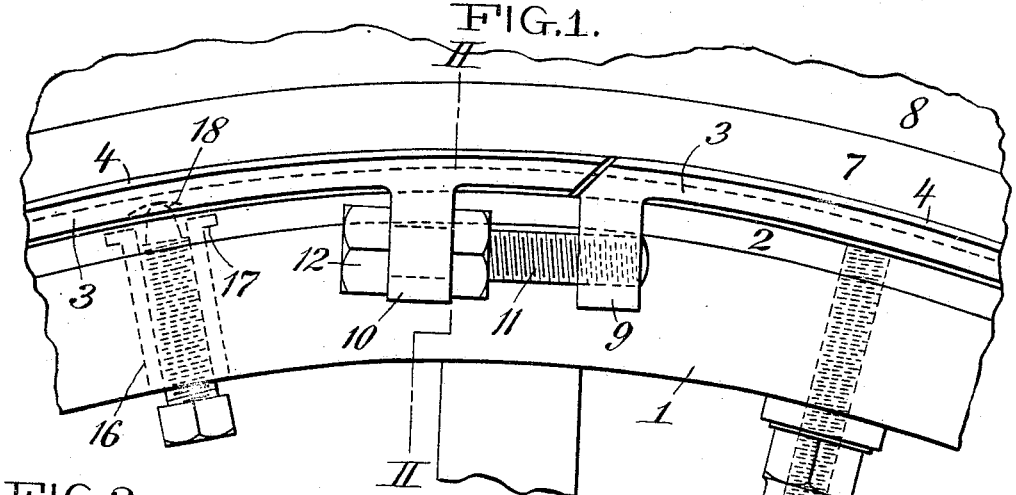
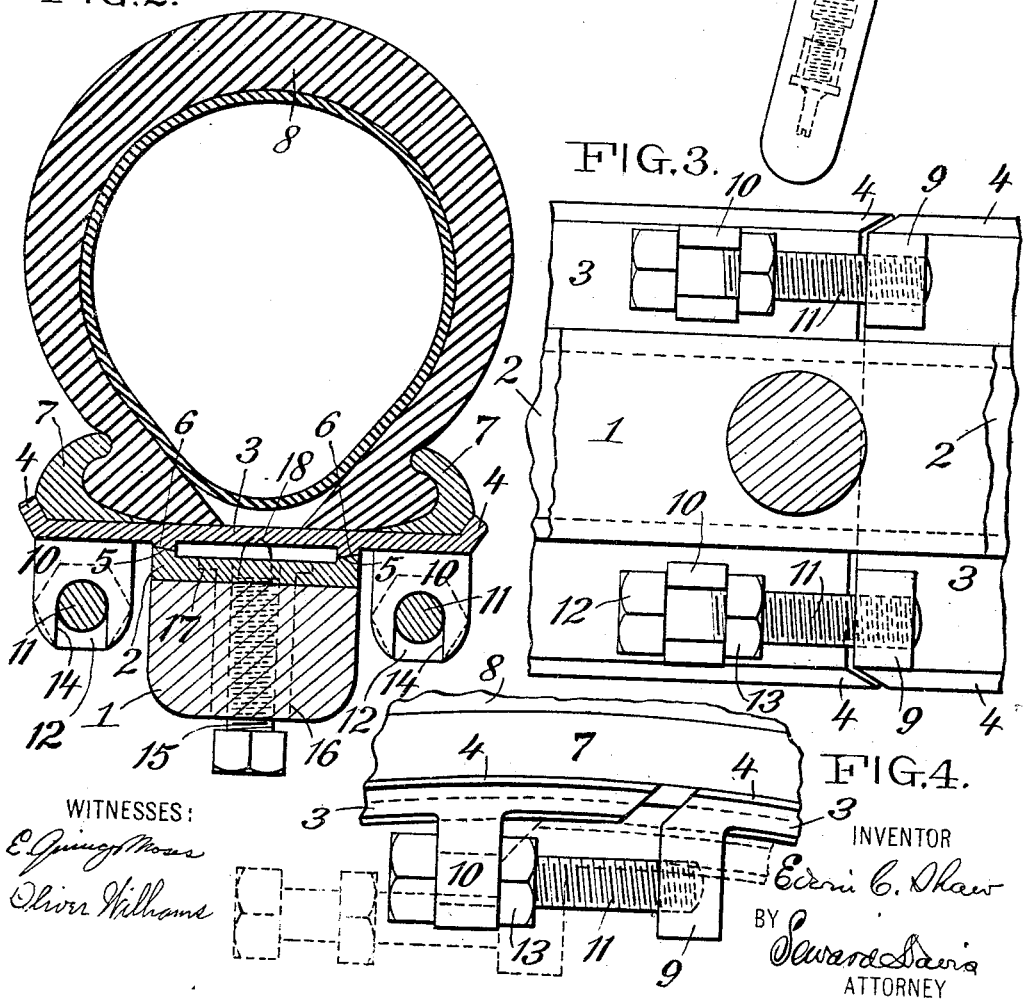
WITNESSES:
INVENTOR
Edwin C. Shaw
BY
Seward Davis
ATTORNEY

UNITED STATES PATENT OFFICE.

EDWIN COUPLAND SHAW, OF AKRON, OHIO, ASSIGNOR, BY MESNE ASSIGNMENTS, TO THE UNITED RIM COMPANY, OF AKRON, OHIO, A CORPORATION OF OHIO.

VEHICLE WHEEL-RIM.

1,055,496.   Specification of Letters Patent.   Patented Mar. 11, 1913.

Application filed May 25, 1907. Serial No. 375,719.

*To all whom it may concern:*

Be it known that I, EDWIN COUPLAND SHAW, a citizen of the United States, residing at Akron, in the county of Summit and State of Ohio, have invented certain new and useful Improvements in Vehicle Wheel-Rims, (Case AL,) of which the following is a specification.

This invention relates to that class of vehicle wheel rims in which one part of the rim is detachable from the wheel, said part being provided with means for engaging and holding the tire. These rims are especially adapted for pneumatic tires and are constructed so that the tire may be easily applied to the detached portion of the rim and inflated, and then transported as a unit to be attached to the wheel whenever desired.

This invention is a modification of the form of rim shown and claimed broadly in my application Serial No. 375,716, filed May 25, 1907. In this modification the detachable rim is split so that it may be contracted sufficiently to permit the tire retaining flanges to pass over it, and it is provided with means for positively expanding and contracting the rim and holding it in its different positions of adjustment. The detachable rim after being placed in position upon the fixed rim can be contracted by the means just mentioned to clamp the fixed rim in firm and close engagement.

I have chosen one specific form of my invention for purposes of illustration, but it is not to be understood that I intend to limit myself to the precise structure illustrated, but that modifications may be freely made so long as the essential and operative combination of elements is retained.

In the drawings forming a part of this specification, Figure 1 is a side elevation of a portion of a wheel fitted with my rim showing the detachable rim in place upon the fixed rim and showing the adjusting means for the ends of the detachable rim, the valve stem, and one of the set screws which I may use as additional means for holding the detachable rim in place. Fig. 2 is a cross section of the parts shown in Fig. 1 taken on line II—II of Fig. 1. Fig. 3 is a bottom plan view of the rim shown in Fig. 1 showing the adjusting means, one of the wheel spokes being shown in section. Fig. 4 is a side elevation of a portion of the detachable rim and tire showing the ends of the detachable rim spread apart to permit the detachable rim to be slipped over the fixed rim and in dotted lines showing the ends of the detachable rim lapped by each other to reduce its diameter.

The same reference numerals are used to indicate the same or like parts throughout.

Referring to the drawings by reference numerals: 1 designates the wheel felly to which is rigidly attached, in any suitable manner, the fixed rim 2; adapted to engage this fixed rim is the split detachable rim 3 having the upstanding flanges 4 at its edges. Inclined faces 5 and 6 are provided on the fixed and detachable rim respectively, said faces being inclined slightly downward and inward so that when the detachable rim is drawn tight in its normal position upon the fixed rim there can be no possibility of relative movement. Adapted to seat upon the detachable rim are the endless tire retaining flanges 7 which are held from outward movement by the flanges 4. These tire retaining flanges are formed to engage the foot of the tire 8 which is shown as a clencher tire though it is obvious that any other form of tire might be used, the retaining flanges being formed of corresponding shape. For the purpose of expanding and contracting the detachable rim, each end of the rim is provided with a pair of lugs, one at each side of the end. On one end of the rim, lugs 9 provided with screw threaded apertures are formed, and on the other end of the rim, yoke shaped lugs 10 are formed. Threaded bolts 11 provided with heads 12 are screwed into the lugs 9. The heads 12 are of suitable form to bear against the yoke shaped lugs 10 and to be engaged by a wrench or screw driver. Nuts 13 are screwed on the bolts 11 and bear against the opposite faces of the lugs 10 from the bolt heads 12. The bolts pass through the open bottomed slots 14 in the lugs 10. As additional means for holding the detachable rim in rigid engagement with the wheel, I may provide set screws 15 which screw through tubular nuts 16 shown in dotted lines in Figs. 1 and 2. These nuts are provided at their upper ends with flanges 17 which engage suitable recesses formed in the outer surface of the fixed rim. The ends of these set screws which are rounded, engage shallow depressions 18 in the inner surfaces of the detachable rim. I may use any number of these set screws but usually prefer three, placed at equal intervals apart.

The operation of my device is as follows: If it is desired to attach the tire, the detachable rim being removed, nuts 13 are loosened and the end of the detachable rim provided with the lugs 9 is depressed so that the bolts 11 will disengage the yoke shaped lugs 10 when the ends of the detachable rim may be lapped past each other as shown in dotted lines in Fig. 4. One of the tire flanges 7 is then slipped over the rim 3 which is easily made possible by the reduced diameter of the rim. The tire is then slipped over and engaged with the flange 7 and the other flange 7 is put on. The ends of the rim are then spread apart, bolts 11 slipped back into their slots in the lugs 10 when, by unscrewing the bolts and screwing up the nuts 13, the lugs 9 and 10 and the ends of the detachable rim are forced apart until the rim tightly engages the inner faces of the flanges 7 as shown in Fig. 4. The tire 8 can then be inflated and the detachable rim and tire are ready to be immediately applied to the wheel or reserved for emergency. With the detachable rim expanded as shown in Fig. 4 its inner diameter is greater than the outer diameter of the fixed rim so that in order to apply the detachable rim and tire it is only necessary to insert the valve stem in its proper opening in the fixed rim and felly and slip the detachable rim over the fixed rim into its seat. Then by unscrewing the nuts 13 and screwing up the bolts 11, the ends of the detachable rim are drawn together, thus reducing the diameter of the detachable rim and the inclined faces 5 and 6 of the two rims are brought into close and rigid contact. The detachable rim is thus locked securely in place as it can not slide sidewise in either direction, and no other locking means are usually necessary. If however it is thought desirable to provide the set screws as an additional locking device, these are now screwed up to tightly engage the inner surface of the detachable rim. Cams or other equivalents of the set screws may be used, but such additional locking device is not essential.

It will thus be seen that a rim has been provided in which the part engaging and holding the tire can be quickly removed and another similar part carrying a ready inflated tire put in its place and also one in which the tire can be quickly and easily taken off from the detachable part of the rim for repairs.

Having thus described my invention, I claim:

1. In combination in a vehicle wheel, a fixed rim, an up-standing flange on each side of said rim, the outer faces of said flanges comprising the surfaces of frustums of cones whose smaller bases face each other, and a detachable rim mounted on said fixed rim, said detachable rim being provided with conical faces engaging the outer faces of the flanges of said fixed rim, said conical faces constituting the only bearing surfaces of the detachable rim upon the fixed rim.

2. In combination in a vehicle wheel, a fixed rim, a split detachable rim, a lug carried by one end of said rim, a bolt carried by said lug, and a yoke shaped lug on the other end of said rim opening downwardly and adapted to removably engage said bolt.

3. In combination in a vehicle wheel, a fixed rim, a split detachable rim, tire engaging means carried by said split detachable rim, a pair of lugs each provided with a screw threaded aperture carried by one end of said rim, a pair of corresponding lugs each provided with an open bottom slot carried by the other end of said rim, screw threaded bolts adapted to engage the apertures in said first named lugs and provided with heads adapted to engage the outer faces of said second named lugs, and nuts screwed on said bolts and adapted to engage the inner faces of said second named lugs.

4. In combination in a vehicle wheel, a fixed rim, a split detachable rim, endless tire engaging flanges mounted thereon, and means for contracting said split rim to cause it to clamp said fixed rim.

EDWIN COUPLAND SHAW.

Witnesses:
    ARTHUR E. DAVISON,
    WALTER K. MEANS.